United States Patent
Chaudhuri et al.

(10) Patent No.: US 6,822,018 B2
(45) Date of Patent: Nov. 23, 2004

(54) THERMALLY-CONDUCTIVE ELECTRICALLY-INSULATING POLYMER-BASE MATERIAL

(75) Inventors: Arun K. Chaudhuri, Carmel, IN (US); Bruce A. Myers, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 414 days.

(21) Appl. No.: 10/075,978

(22) Filed: Feb. 15, 2002

(65) Prior Publication Data

US 2003/0158294 A1 Aug. 21, 2003

(51) Int. Cl.[7] .............................. C08K 9/04; C08K 3/08; H05K 7/20

(52) U.S. Cl. ....................... 523/210; 523/200; 524/404; 524/424; 524/428; 174/16.3; 174/17 SF

(58) Field of Search .................................. 523/210, 200; 524/404, 424, 428; 174/16.3, 17 SF

(56) References Cited

U.S. PATENT DOCUMENTS

| | | | | |
|---|---|---|---|---|
| 5,060,114 A | * | 10/1991 | Feinberg et al. | ............. 361/706 |
| 5,288,769 A | * | 2/1994 | Papageorge et al. | ........ 523/200 |
| 5,785,913 A | * | 7/1998 | Clark et al. | .................. 264/109 |
| 6,065,612 A | * | 5/2000 | Rinderer | ...................... 211/26 |

* cited by examiner

*Primary Examiner*—Tae H. Yoon
(74) *Attorney, Agent, or Firm*—Stefan V. Chmielewski

(57) ABSTRACT

An electrically-insulating polymer-based material with improved thermal conductvity so as to be suitable for use as an adhesive for mounting and conducting heat from electronic devices. The polymer-based material comprises metal particles dispersed in a matrix material. The metal particles are encapsulated by a dielectric coating so that they are electrically insulated from each other. The polymer-based material may also comprise dielectric particles dispersed in the matrix material and/or the dielectric coating for the purpose of further increasing the thermal conductivity of the polymer-based material. The material is also suitable for use as a potting compound or an encapsulation material for various electronic applications.

20 Claims, 2 Drawing Sheets

THERMALLY-CONDUCTIVE ELECTRICALLY-INSULATING POLYMER-BASE MATERIAL

STATEMENT REGARDING FEDERALLY-SPONSORED RESEARCH

Not applicable.

BACKGROUND OF THE INVENTION

The present invention generally relates to electrically insulating polymeric compositions that are suitable for use as adhesives, potting compounds and encapsulating materials for electronic devices. More particularly, this invention relates to an electrically-insulating polymer-base material with enhanced thermal conductivity so as to be particularly suitable for heat management of electronic devices.

Heat generated by electronic devices during normal operation can cause overheating and device failure if not adequately conducted away. Steady-state heat can be removed from the device and dissipated to the surrounding environment by the manner in which the device is mounted to its supporting structure and the use of heat sinks that conduct and/or dissipate the heat. For example, it is standard practice to attach an integrated circuit (IC) chip and other power-dissipating devices directly to a heat sink. Many heat sinks are electrically conductive, and therefore must be electrically insulated from the device to prevent shorting of electrical signals. For this reason, device attachment is often with an electrically insulating adhesive, which typically comprises an adhesive resin mixed with thermally-conductive dielectric filler particles, such as ceramics including alumina ($Al_2O_3$), aluminum nitride (AlN) and boron nitride (BN). In this manner, the low thermal conductivity of the resin (e.g., about 0.23 W/m° C.) is raised by the ceramic filler material (e.g., about 40 W/m° C.). However, the thermal conductivities of ceramic materials are much lower than metals such as copper (about 395 W/m° C.) and other highly thermally-conductive materials.

With an ever-increasing need for more efficient heat removal from high power electronic devices, traditional thermally conductive adhesives are not adequate for many applications. Accordingly, it would be desirable if an electrically-insulating adhesive having improved thermal conductivity was available. It can be appreciated that for an electrically-insulating adhesive to be suitable for a wide range of applications in electronic products, the material should also be relatively low cost, have a low ionic content for corrosion resistance, exhibit acceptable voltage breakdown, and undergo minimal material property changes after long term exposure to the operating environment.

BRIEF SUMMARY OF THE INVENTION

The present invention provides an electrically-insulating polymer-based material with improved thermal conductivity so as to be suitable for use as an adhesive for mounting and conducting heat from electronic devices. The material is also suitable for use as a potting compound and an encapsulation material for various electronic applications. The polymer-based material comprises a polymer matrix material in which are dispersed metal particles that are individually encapsulated by a dielectric coating so that the metal particles are electrically insulated from each other. The dielectric coating is insoluble in the matrix material so that the electrical insulation provided by the coating between particles does not degrade. In a preferred embodiment, the polymer-based material also comprises dielectric particles dispersed in the matrix material and/or the dielectric coating for the purpose of further increasing the thermal conductivity of the polymer-based material.

To yield a thermally stable material, the metal particles preferably have a melting temperature well above the maximum operating temperature of the electronic device with which the polymer-based material is used, i.e., contacts, bonds, encases, etc. For example, the metal particles may be formed of such electrically-conductive metals as copper, aluminum and/or silver. The dielectric coating has a softening temperature that is higher than the maximum operating temperature of the electronic device, but can be well below the melting temperature of the metal particles. As a result, both the metal particles and the dielectric coating are stable throughout the operating temperature range of the electronic device with which the polymer-based material is used. Suitable matrix materials for the polymer-based material of this invention are electrically nonconductive, and are preferably capable of stopping ionic intrusion, have low ionic content for corrosion resistance, good adhesion properties, and stable material properties even after long exposures within operating environments typically required of electronic devices. As a result of the above properties of its constituents, the polymer-based material of this invention is able to maintain desirable electrical insulation and thermal conduction properties when used as an adhesive, potting compound or encapsulation material for a wide variety of electronic devices, including IC chips and other power-dissipating devices that are mounted to a heat sink for thermal management.

Other objects and advantages of this invention will be better appreciated from the following detailed description.

DETAILED DESCRIPTION OF THE INVENTION

Figure 1:
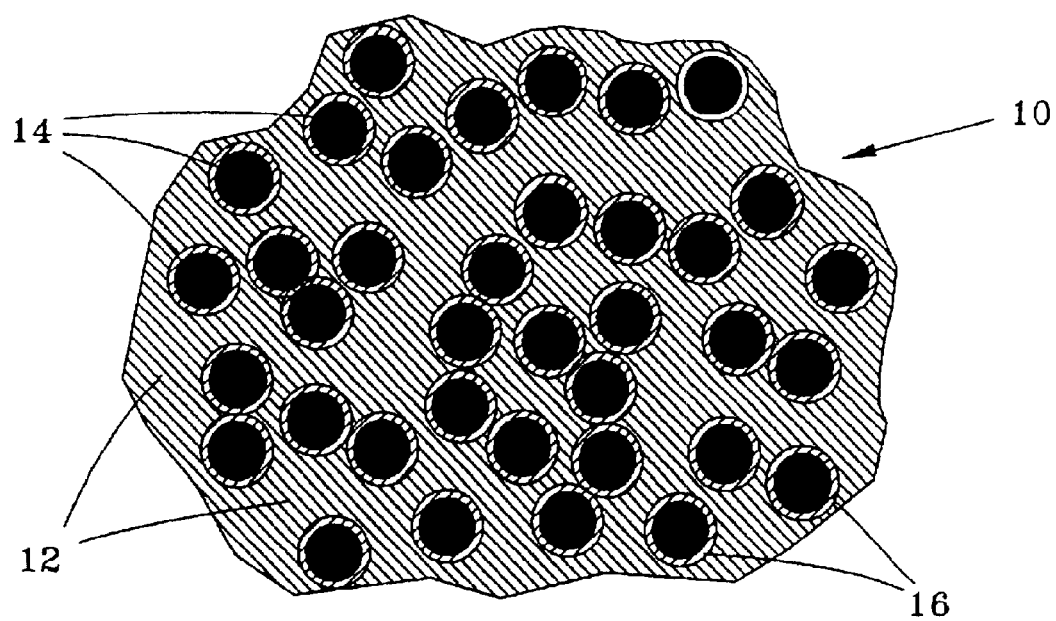
FIGS. 1, 2 and 3 represent polymer-based materials in accordance with three embodiments of the present invention.
Figure 2:
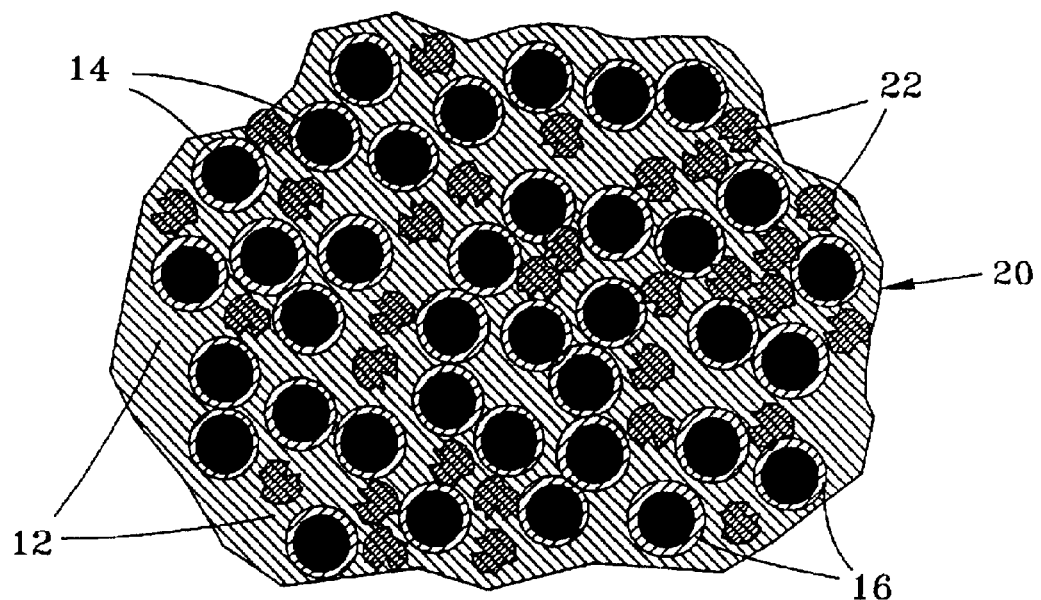
Figure 3:
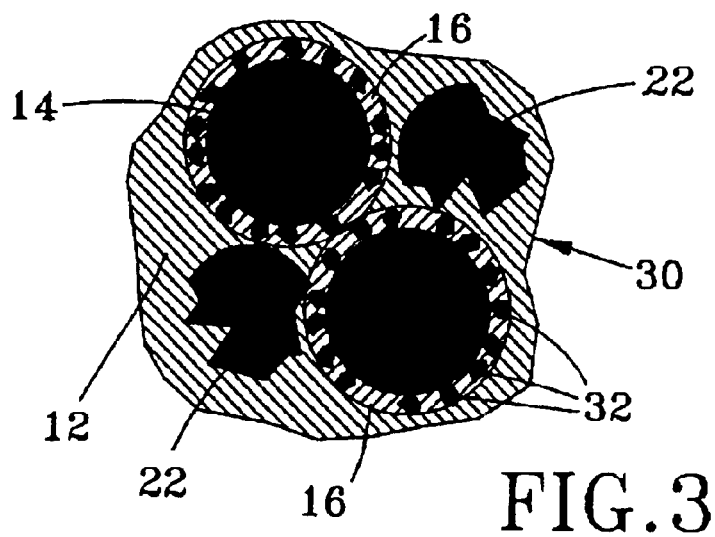
Figure 4:
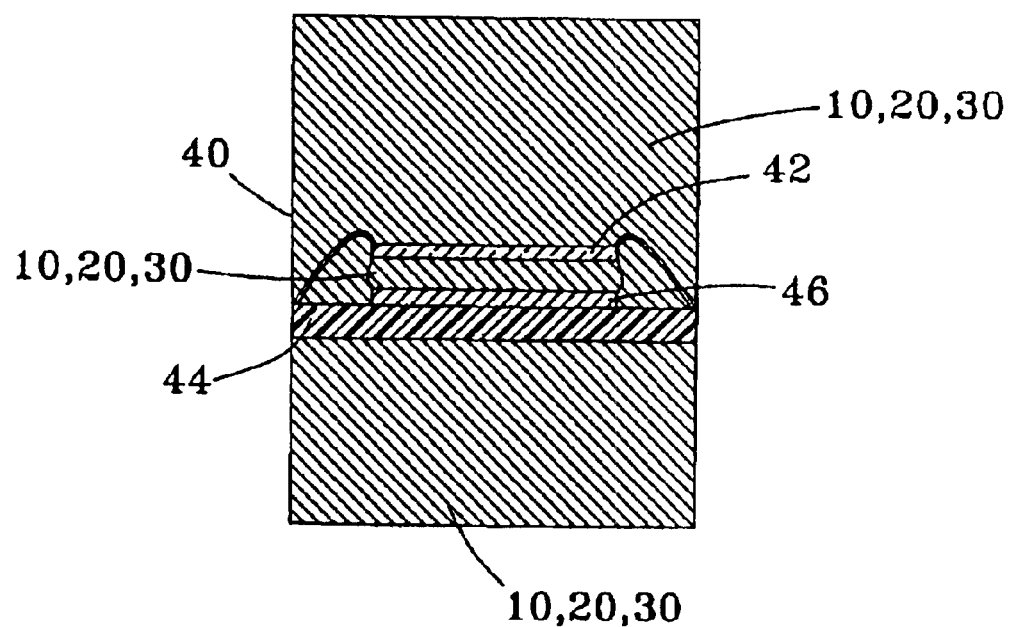
FIG. 4 represents an application for the polymer-based materials of this invention.

FIGS. 1 through 3 represent three polymer-based materials formulated to have properties desired for a thermally-conductive adhesive in accordance with the present invention. The polymer-based material of each embodiment may also be used as a potting compound or an encapsulation material to pot or encapsulate a heat-generating power device on a circuit board or an entire electronic module, as shown in FIG. 4. In each embodiment, metal particles that are individually coated with a dielectric material are employed to promote the thermal conductivity of the polymer-based material while also providing suitable and stable electrical insulating properties.

With reference to FIG. 1, the polymer-based material 10 is represented as comprising a matrix material 12 in which coated metal particles 14 are dispersed to promote the thermal properties of the material 10. Because metals are electrically conductive, the particles 14 are provided with a dielectric coating 16 to ensure that the polymer-based material 10 is not electrically conductive. In addition to high thermal conductivity and low electrical conductivity, desirable properties for the polymer-based material 10 include those that facilitate material handling, such as a suitable viscosity for dispensing the material 10, and those that promote the integrity of the final encapsulated module or package, such as adequate strength and a low elastic modulus. Suitable materials for the matrix material 12 include epoxies, silicones and polyurethanes. Preferred materials for the matrix material 12 include gel materials, particularly silicone gels that have advantageous properties for potting applications, such as their ability for self-containment (as a result of being a gel), the ability to stop liquid and ionic intrusion, high electrical resistance, low ionic content for corrosion resistance, low elastic modulus, and minimal material property changes after long exposures to high temperatures. A particularly suitable silicone gel is available from Dow Corning under the name TOUGH GEL-4207®, which is generally a mixture of dimethyl siloxane, dimethyl siloxane-dimethyl vinyl terminated, dimethyl siloxane-hydrogen terminated, trimethylate silica, and dimethyl solxane. Tough Gel is particularly suitable as having a viscosity (about 4.5 poise at 25° C.) before curing that allows the polymer-based material 10 to be initially applied as a viscous liquid, then cures to a soft gel solid having such desirable mechanical properties as a glass transition temperature below −40° C., a volume coefficient of thermal expansion (CTE) of about $8.2 \times 10^{-4}$ cc/cc/° C. (25 to 100° C.), a tensile strength of about 45 psi (about $3.1 \times 10^5$ Pa), a hardness of about 66 Shore A, elastic elongation of about 265%, and a modulus of elasticity of about 0.75 psi (about 0.05 bar), and desirable electrical properties such as a dielectric constant of about 2.78 at 100 Hz and a dielectric strength of about 385 volts/mil.

In addition to being thermally conductive, the particles 14 must have a high melting temperature so as not to melt at temperatures within the maximum operating range of the electronic device for which the material 10 is used. While thermal conditions will vary depending on the particular application, metals with a melting temperature (MP) or a solidus temperature of at least about 175° C. are believed to be adequate for most power-generating electronic devices. While various metals and metal alloys meet these requirements, including molybdenum, tungsten and other metals and metal alloys with high thermal conductivity, particularly suitable metals include copper (MP=1083° C.), aluminum (MP=660° C.) and silver (MP=961° C.). A suitable size for the metal particles 14 is less than 0.5 cm, with a preferred range being about 4.5 to about 10 micrometers. The preferred size range is intended to promote encapsulation of the particles 14 with the coating 16 and a uniform dispersion of the particles 14 in the matrix material 12.

The dielectric coating 16 is required to be insoluble in the matrix material 12 so that the electrical insulation provided by the coating 16 between particles 14 does not degrade. The electrical insulation properties of the coating 16 must also remain stable or at least sufficient at temperatures at least equal to and preferably higher than the maximum operating temperature of the particular electronic device contacted by the polymer-based material 10. Preferred materials for the dielectric coating 16 are an amorphous polyetherimide thermoplastic resin commercially available from General Electric under the name ULTEM®, polypropylene oxide (PPO), and an acrylate commercially available from DuPont under the name ELVACITE®. Other high electrically-resistive polymeric materials could also be used, as long as the coating 16 has suitable properties at high temperatures, including a softening temperature of at least 175° C. and generally up to the melting temperature of the particles 14. The coating 16 is preferably applied to the metal particles 14 prior to mixing the particles 14 into the matrix material 12, which ensures that the metal particles 14 will be completely encapsulated within the coating 16 so as not to provide an electrical conduction path through the polymer-based material 10. For this purpose, the coating 16 is preferably applied in a range of about 0.5 to 6% by weight of a particle 14 to yield a suitable coating thickness, with a preferred range being less than 1 weight percent to maximize the thermal conductivity of the coated particle 14.

The coated particles 14 described above are combined with the matrix material 12 to form a viscous liquid that can be cured by heat, UV exposure and/or another suitable method to yield the polymer-based material 10. Suitable mixtures contain about 50 to about 80 weight percent coated particles 14 (i.e., the particles 14 and coating 16 combined), with the balance being the matrix material 12. A preferred polymer-based material 10 using the TOUGH GEL silicone matrix material 12 contains about 60 to about 70 weight percent coated particles 14, with the balance the matrix material 12.

FIG. 2 represents a polymer-based material 20 intended for more demanding applications that require greater thermal conductivity for high-power electrical components. The polymer-based material 20 can comprise the same matrix material 12, metal particles 14 and coating 16 as that described for FIG. 1, with the addition of particles 22 of a dielectric material. Suitable materials for the dielectric particles 22 are those that are more thermally conductive than the matrix material 12, and therefore serve as a filler that raises the coefficient of heat transfer of the polymer-based material 20. Certain ceramic materials are particularly suitable for this purpose, with preferred materials being alumina ($Al_2O_3$), boron nitride (BN), aluminum nitride (AlN), silicon carbide (SiC) and silicon nitride ($Si_3N_4$), though it is foreseeable that other non-electrically conductive materials with thermal conductivities higher than that of the matrix material 12 could be used. A suitable size for the dielectric particles 22 is about 0.5 to about 200 micrometers, with a preferred range being about 0.45 to 10 micrometers for the purpose of achieving a suitable viscosity for the uncured polymer-based material 20 and a suitable thermal conductivity for the cured polymer-based material 20. Coated metal particles 14 and dielectric particles 22 can be combined with the matrix material 12 at levels of about 30 to about 70 weight percent coated particles 14 (particles 14 and coating 16 combined) and about 0.5 to about 10 weight percent dielectric particles 22, with the balance being the matrix material 12. Preferred ranges for the polymer-based material 20 are about 40 to about 60 weight percent coated particles 14 (particles 14 and coating 16 combined), about 0.5 to about 2 weight percent dielectric particles 22, and about 38 to about 59.5 weight percent matrix material 12.

As shown in FIG. 3, thermal transfer through a polymer-based material 30 of this invention can be further improved with the addition of smaller thermally-conductive but dielectric particles 32 to the coating 16 surrounding the metal particles 14. These particles 32 are preferably added to the material for the coating 16 prior to the particles 14 being coated. The same materials discussed above for the particles 22 can be used for the particles 32. However, the particles 32 are preferably sized to be adhered to the metal particles 14 with the coating 16. For this reason, a suitable size range for the particles 32 is about 1 to about 40 micrometers, with a preferred size being about 2 to about 20 micrometers, which is roughly the thickness of the coating 16. The dielectric particles 32 can be used in amounts of about 50 to about 90 weight percent of the coating 16. Dielectric particles 22 and metal particles 14 encapsulated with the coating 16 containing the dielectric particles 32 can be combined with the matrix material 12 at levels of about 50 to about 80 weight percent coated particles 14 (particles 14 and coating 16 combined), about 0.5 to about 10 weight percent dielectric particles 22, and about 0.5 to about 6.0 weight percent dielectric particles 32, with the balance being the matrix material 12. If the dielectric particles 22 are omitted, the metal particles 14 encapsulated with the coating 16 containing the dielectric particles 32 can be combined with the matrix material 12 at levels of about 50 to about 80 weight percent coated particles 14 (particles 14 and coating 16 combined) and about 0.5 to about 6.0 weight percent dielectric particles 32, with the balance matrix material 12. Preferred ranges for the polymer-based material 30 are about 1.0 to about 5.0 weight percent dielectric particles 22, about 60 to about 70 weight percent coated particles 14 (i.e., particles 14, coating 16 and dielectric particles 32 combined), and about 25 to about 39 weight percent matrix material 12.

With each of the above embodiments, the polymer-based material 10, 20 and 30 is preferably applied in a liquid or paste form and then subsequently cured by heat, UV exposure and/or other methods known in the industry. A liquid form is preferred if the material 10, 20 or 30 is to be used as a potting material, while a paste form is preferred if the material 10, 20 or 30 is to be used as an adhesive. If the cured polymer-based materials 10, 20 and 30 have the consistency of a soft gel solid, they are particularly suitable for use as potting compounds. FIG. 4 represents the use of the polymer-based materials 10, 20 and 30 of this invention as both an adhesive and a potting compound. In FIG. 4, one of the polymer-based materials 10, 20 or 30 is shown as adhesively mounting a surface-mount (SM) power device 42 to a heat sink 46 on a circuit board 44, forming an electronic module 40 that is potted with any one of the polymer-based materials 10, 20 and 30. As such, the polymer-based material 10, 20 and/or 30 is in direct contact with the power device 42 as well as the heat sink 46 and the backside of the circuit board 44. In this manner, the polymer-based material 10, 20 and/or 30 is able to seal the device 42 and circuit board 44 within an open or closed case (not shown) to protecting the device 42 from a hostile operating environment.

As examples of the present invention, adhesives were formulated to contain metal particles of copper individually encapsulated by a dielectric coating that contained boron nitride particles commercially available under the name Polar Therm Powder PT-180 from Advanced Ceramics Corporation. The metal particles had an average particles size of less than 45 micrometers (−325 mesh+500 mesh), while the boron nitride particles had a particle size range of about 5 to 15 micrometers and a surface area of about 15 to 21 $m^2/g$. In a first example of the invention, the metal particles were granulated with about 1.5 weight percent ULTEM in a fluid bed to form a dielectric coating, and then further coated with about 0.5 weight percent of the boron nitride particles and about 0.5 weight percent PPO. In a second example of the invention, the same materials were used but the metal particles combined with about 1.5 weight percent ULTEM, about 1 weight percent of the boron nitride particles and about 1 weight percent PPO. Samples of each type of coated particle were then admixed with TOUGH GEL silicone at a level of about 50 weight percent coated particles. The resulting viscous liquids were cured at a temperature of about 85° C. for about 20 minutes to form adhesives characterized as a soft gel solid.

While the invention has been described in terms of a preferred embodiment, it is apparent that other forms could be adopted by one skilled in the art. Accordingly, the scope of the invention is to be limited only by the following claims.

What is claimed is:

1. A polymer-based material comprising:
   a polymer matrix material; and
   metal particles dispersed in the matrix material; and
   a dielectric coating individually encapsulating each of the metal particles so as to electrically insulate the metal particles from each other, the dielectric coating being insoluble in the matrix material and having a softening temperature below the melting temperature of the metal particles.

2. The polymer-based material according to claim 1, wherein the matrix material is formed of an epoxy, silicone, or polyurethane.

3. The polymer-based material according to claim 1, wherein the metal particles are formed of copper, aluminum or silver.

4. The polymer-based material according to claim 1, further comprising dielectric particles dispersed in the matrix material, the dielectric particles having a higher coefficient of thermal conductivity than the matrix material.

5. The polymer-based material according to claim 4, wherein the dielectric particles are formed of a ceramic material.

6. The polymer-based material according to claim 4, wherein the dielectric coating comprises second dielectric particles dispersed therein, the second dielectric particles being smaller than the dielectric particles dispersed in the matrix material.

7. The polymer-based material according to claim 6, wherein the second dielectric particles are formed of a ceramic material having a higher coefficient of thermal conductivity than the matrix material.

8. The polymer-based material according to claim 1, wherein the dielectric coating is a polymer having a softening temperature of at least 175° C.

9. The polymer-based material according to claim 1, wherein the dielectric coating comprises dielectric particles dispersed therein.

10. The polymer-based material according to claim 9, wherein the dielectric particles are formed of a ceramic material having a higher coefficient of thermal conductivity than the matrix material.

11. The polymer-based material according to claim 1, wherein the polymer-based material is an adhesive that bonds a heat-generating power device to a substrate.

12. The polymer-based material according to claim 1, wherein the polymer-based material encases a heat-generating power device.

13. An adhesive material contacting a heat-generating electronic device, the adhesive material comprising:
   about 50 to about 80 weight percent of metal particles having a melting temperature above a maximum operating temperature of the heat-generating electronic device;
   a dielectric polymer coating individually encapsulating each of the metal particles so as to electrically insulate the metal particles from each other, the polymer coating having a softening temperature of at least the maximum operating temperature of the heat-generating electronic device but below the melting temperature of the metal particles;
   about 0.5 to about 10 weight percent of dielectric particles; and
   the balance essentially a polymeric gel in which the metal particles and the dielectric particles are dispersed, the dielectric particles having a higher coefficient of thermal conductivity than the gel.

14. The adhesive material according to claim 13, wherein the dielectric particles are formed of alumina, boron nitride, aluminum nitride, silicon carbide and/or silicon nitride.

15. The adhesive material according to claim 13, wherein the dielectric polymer coating comprises about 50 to about 90 weight percent of second dielectric particles dispersed therein, the second dielectric particles having a higher coefficient of thermal conductivity than the gel.

16. The adhesive material according to claim 15, wherein the second dielectric particles are formed of alumina, boron nitride, aluminum nitride, silicon carbide and/or silicon nitride.

17. The adhesive material according to claim 15, wherein the second dielectric particles are smaller than the dielectric particles dispersed in the gel.

18. The adhesive material according to claim 13, wherein the gel is an epoxy, or polyurethane.

19. The adhesive material according to claim 13, wherein the adhesive material bonds the heat-generating electronic device to a substrate.

20. The adhesive material according to claim 13, wherein the adhesive material encases the heat-generating electronic device.

* * * * *